United States Patent [19]

Sharpless

[11] 4,416,193

[45] Nov. 22, 1983

[54] SYSTEM FOR VAPOR PRECIPITATION AND RECOVERY IN A CONTINUOUS COATER

[75] Inventor: John Sharpless, Oberlin, Ohio

[73] Assignee: Nordson Corporation, Amherst, Ohio

[21] Appl. No.: 346,014

[22] Filed: Feb. 5, 1982

[51] Int. Cl.³ .................. B05D 1/02; B01D 47/06
[52] U.S. Cl. .................. 98/115 SB; 55/238; 55/241; 55/257 PV; 55/DIG. 46; 118/326; 118/DIG. 7; 427/424; 261/111
[58] Field of Search .............. 55/85, 90, 94, 226, 55/228, 238, 241, 257 PV, DIG. 46; 261/111; 98/115 SB; 118/326, 634, DIG. 7; 427/345, 424

[56] References Cited

U.S. PATENT DOCUMENTS

| | | | |
|---|---|---|---|
| 1,966,280 | 7/1934 | Bingman | 55/DIG. 46 |
| 2,337,983 | 12/1943 | Fisher | 55/241 |
| 3,237,381 | 3/1966 | Hvostoff et al. | 55/90 |
| 3,382,845 | 5/1968 | Jester | 55/DIG. 46 |
| 3,608,274 | 9/1971 | Stingelin et al. | 55/226 |
| 3,966,438 | 6/1976 | Nicholson | 55/238 |
| 4,132,537 | 1/1979 | Bennett | 55/226 |
| 4,185,975 | 1/1980 | Scharf | 55/238 |
| 4,206,159 | 6/1980 | Angelini et al. | 55/226 |
| 4,313,742 | 2/1982 | Ostlie | 55/241 |
| 4,338,364 | 7/1982 | Kennon et al. | 98/115 SB |

Primary Examiner—David L. Lacey
Attorney, Agent, or Firm—Oldham, Oldham, Hudak, Weber & Sand Co.

[57] ABSTRACT

A system for precipitating vapors from a continuous coater and retrieving suspended matter therefrom. The entrance and exit passages communicating with a spray coating booth are vented to a scrubbing chamber where a precipitant spray drives the vapors through a precipitant baffle. Suspended matter in the vapor is thus precipitated and drained into a recovery tank. The scrubbed vapors are then exhausted up a stack. In one embodiment of the invention, the vapors are vented through openings in the top of the entrance and exit passages, in which embodiment there is also provided an input chamber for receiving the vapors and transferring the same to the scrubbing chamber. In a second embodiment, the vapors are vented through openings in the side walls of the entrance and exit passages, in which case they are vented directly to the scrubbing chamber. In both embodiments, the precipitant spray is directly against the precipitant baffle resulting in the precipitation of large particles, such that there is no requirement for the provision of a plenum chamber or settling area. Additionally, the precipitation baffle is kept clean by the constant spray.

18 Claims, 4 Drawing Figures

SYSTEM FOR VAPOR PRECIPITATION AND RECOVERY IN A CONTINUOUS COATER

TECHNICAL FIELD

The invention herein resides in the art of continuous coaters of the type having a spray booth through which products are transported and sprayed with an appropriate coating. More particularly, the invention relates to a system and method for scrubbing and recovering particulate matter from vapors seeking to escape from the spray booth out of the entrance or exit through which the products are conveyed.

BACKGROUND ART

Continuous coaters have been known for a number of years and have been widely accepted in industry for achieving rapid, uniform, and economic coating of manufactured articles. Such coaters are now used for coating products with paints and the like, including acrylics, alkyds, asphaltums, oil and water base paints, various varnishes, and vinyls. In some of the coating operations, air can be tolerated in the coating booth or chamber, while in the other applications a solvent-rich atmosphere is maintained.

In coating booths utilizing a solvent-rich atmosphere, the coating material is atomized hydraulically and directed onto a substrate to be coated. By hydraulic atomization, it is meant that the coating material is atomized by means of an orifice through which coating material is pumped at high pressure. When the coating material is sprayed, some of the solvent present in the coating material evaporates upon discharge from the nozzle. Shortly, the solvent vapors expand as a cloud, displacing substantially all of the air in the interior of the coating booth, and provides for a solvent-rich atmosphere therein.

Solvent-rich atmosphere coaters result in a condition within the spray booth where oversprayed material does not tend to solidify on the interior of the chamber walls, or other interior surfaces. This expanding solvent-rich cloud is desirably maintained within the coating booth and prevented from escaping into the work area in which the continuous coater is maintained. Since most continuous coaters have entrance and exit openings in them for the transport of products, special care must be taken to prevent escape of the solvent vapors within the booth. It has been previously known to vent this expanding cloud of vapors into a recovery area adjacent both the entrance and the exit.

Various types of filtering and recovery systems have been incorporated with continuous coaters in the past. For example, U.S. Pat. No. 4,185,975, teaches an embodiment for a coater exhaust which has been well received and widely used in the industry. Similarly, the state of the art of vapor exhaust and recovery systems for continuous coaters is set forth in *Nordson Continuous Coater,* publication No. 306-18-365, published in 1980 by Nordson Corporation of Amherst, Ohio, the assignee of the instant invention. These prior art structures all teach a vapor recovery system which communicates with the spray booth at the entrance and exit thereof, drafting the expanding cloud of vapor into the system. Most generally, holes or slots in the housing of the entrance and exit provide for such communication.

The known systems typically comprise a plurality of chambers. The first chamber receives the vapor and air through the holes or slots and passes them on to a second chamber where the vapor is subjected to a precipitant spray, causing paint particles and other contaminants in the vapor to be precipitated out of the vapor. This second chamber is typically isolated by sheet metal or the like from the first chamber, such that the precipitant spray does not have an opportunity to pass through the holes or slot and enter into the spray booth or into the area of the conveyor transporting the workpiece to the spray booth.

Subsequent to the second chamber, there has typicaly been provided a plenum chamber to receive the precipitated paint particles and contaminants, allowing them to drop out of the plenum chamber and into a recovery tank positioned therebelow. In order to allow very small particles to settle, the plenum chamber must be of a large size; particles of 3 microns settling in an eleven foot diameter chamber. Indeed, the plenum chamber acts as a settling area of the precipitated paint and contaminants.

Above the plenum chamber is an exhaust stack, generally having a fan positioned at the top thereof to draw the air and vapor, which has now been scrubbed, upward for dissipation into the atmosphere. Positioned at the top of the stack, just before the exhaust fan, prior art has taught the positioning of a precipitation baffle, providing means for condensation of the precipitated vapor with the resulting condensed liquid dropping from the precipitation baffle down the exhaust stack and into the recovery tank. Accordingly, particles are first allowed to settle out of the precipitated vapor in the settling area defined by the plenum chamber, with further settling being achieved by a precipitation or moisture separation baffle positioned at the top of the exhaust stack.

Previously, the vapor and air have been drawn through the holes or slots in the entrance and exit by means of the draft generated by the precipitant spray achieved in the second chamber. An exhaust fan was used in the exhaust stack only to aid this draft generation, it being desired that the draft be a gentle one such that the plenum chamber would be sufficiently quiescent to allow the precipitated matter to drop out into the settling tank. Accordingly, it was difficult to obtain designs having sufficient air flow to maintain the cloud within the spray booth while having a plenum chamber sufficiently quiescent to allow for the settling of small particles.

In substance, the prior art has taught the need of three separate chambers. The first, or inlet chamber, was configured to prevent the precipitant spray from reaching the coating booth or the entrance or exit through which the product passed. The second chamber was the precipitant spray chamber in which the air and vapor were subjected to the spray of a suitable precipitant such as water. The third chamber was that of the plenum, being of sufficiently large geometric size to accommodate the settling of small particles. Below the plenum chamber was a settling tank to which the precipitant or water returned along with the settled-out paint or other contaminants. Above the plenum chamber was the exhaust stack, being characterized by a precipitant or moisture separation baffle for final condensation of particulate matter. It will be appreciated that these baffles provide a tortuous path for air to escape, such path accommodating condensation. Finally, in the settling tank, the paint and other contaminants which rise to the top are filtered and recycled for use in the spray booth.

An inherent problem has been apparent with these known structures. While they have operated efficiently, their sheer size, obstructing otherwise usable space, has been undesirable. Further, they have been of a complex nature, requiring intricate sheet metal work to separate the three chambers from each other, while obtaining the necessary flow path to obtain the desired precipitation and separation. Additionally, the known systems have required frequent maintenance, particularly cleaning of the first or inlet chamber, which chamber is subjected to a combination of ambient air and vapor containing paint or coating particles. Since the air entering the first chamber is no longer solvent-rich, the paint or coating has a tendency to adhere and bond to the walls of that chamber. Additionally, the precipitation baffle in the exhaust stack is subject to frequent clogging and plugging. Accordingly, both the first chamber and the baffle require frequent and routine cleaning to maintain the operability of the recovery system.

DISCLOSURE OF INVENTION

In light of the foregoing, it is an object of an aspect of the invention to provide a vapor precipitation and recovery system which is of a compact nature, being substantially reduced in size over systems of the prior art.

Another object of an aspect of the invention is to provide a vapor precipitation and recovery method and system which substantially reduces the number of chambers previously utilized in the prior art.

Yet another object of an aspect of the invention is to provide a vapor precipitation and recovery method and system in which a precipitant spray is directed immediately against precipitation baffles, keeping the baffles clean, resulting in larger particles and obviating the necessity of a plenum chamber for settling such particles.

Still a further object of an aspect of the invention is to provide a vapor precipitation and recovery system in which the inlet chamber is subjected to a precipitant spray, such that coating material does not adhere to the walls of the chamber.

Still a further object of an aspect of the invention is to provide a vapor precipitation recovery method and system which is simplistic in construction and operation, readily implemented with state-of-the-art elements, and adaptable for incorporation with presently existing coating apparatus.

The foregoing and other objects of aspects of the invention which will become apparent as the detailed description proceeds are achieved by the improvement of a vapor precipitation and recovery system for use in a continuous coater having entrance and exit passages, such improvment comprising: a scrubbing chamber adjacent at least one of the passages and in communication therewith; a source of precipitant spray maintained within said scrubbing chamber; and a precipitant baffle maintained within said scrubbing chamber and in juxtaposition to said source of spray.

Other objects of aspects of the invention are obtained by the method in a continuous coater of precipitating vapors and recovering particulate matter therefrom comprising: drawing vapors escaping from a coating booth into a chamber; and spraying said vapors with a precipitant directly onto a precipitant baffle.

BRIEF DESCRIPTION OF DRAWINGS

For a complete understanding of the objects, techniques, and structure of the invention, reference should be had to the following detailed description and accompanying drawings wherein.

DETAILED DESCRIPTION OF PREFERRED EMBODIMENTS

Figure 1:
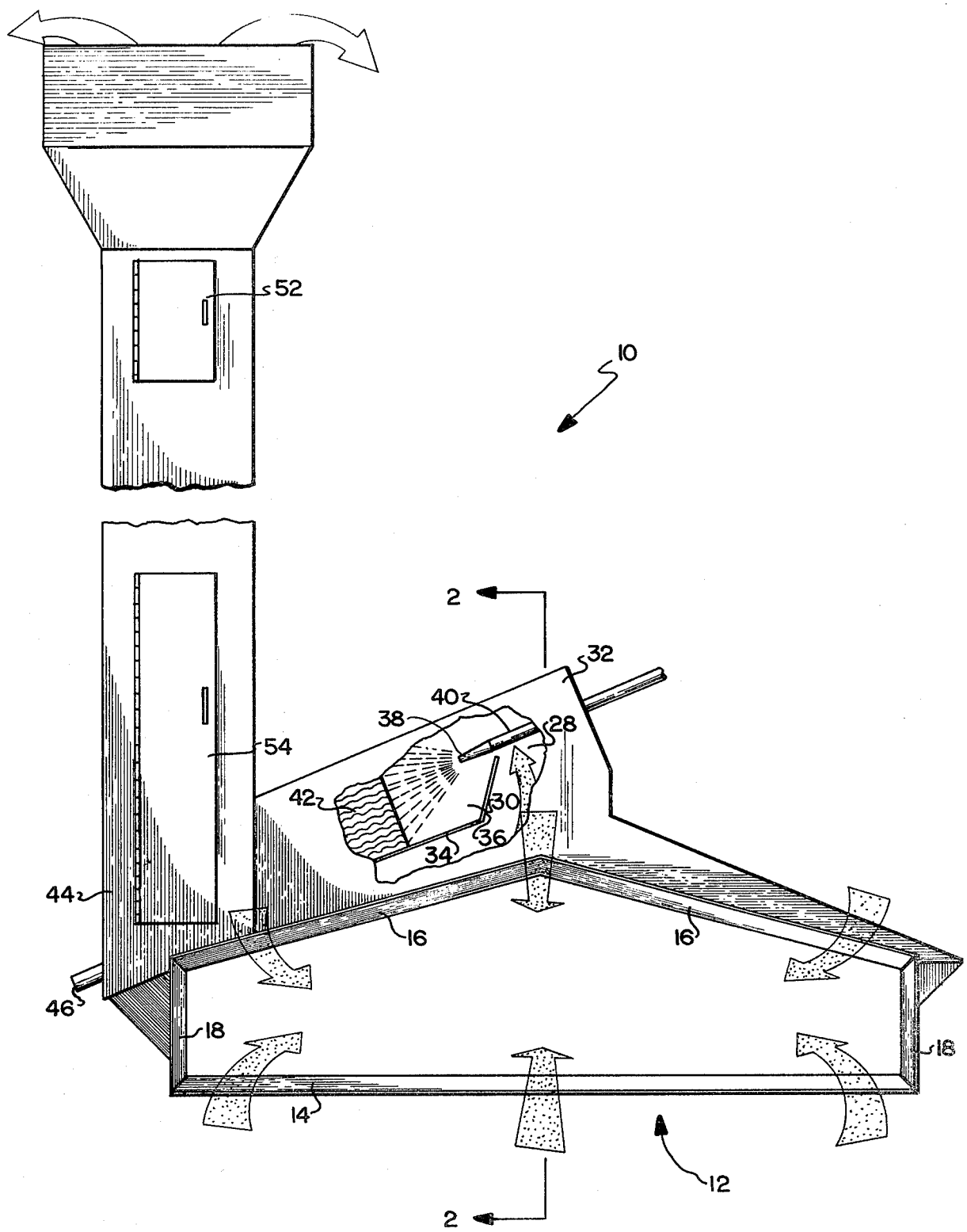
FIG. 1 is a front elevational view of a first embodiment of the invention, shown in partial section.
Figure 2:
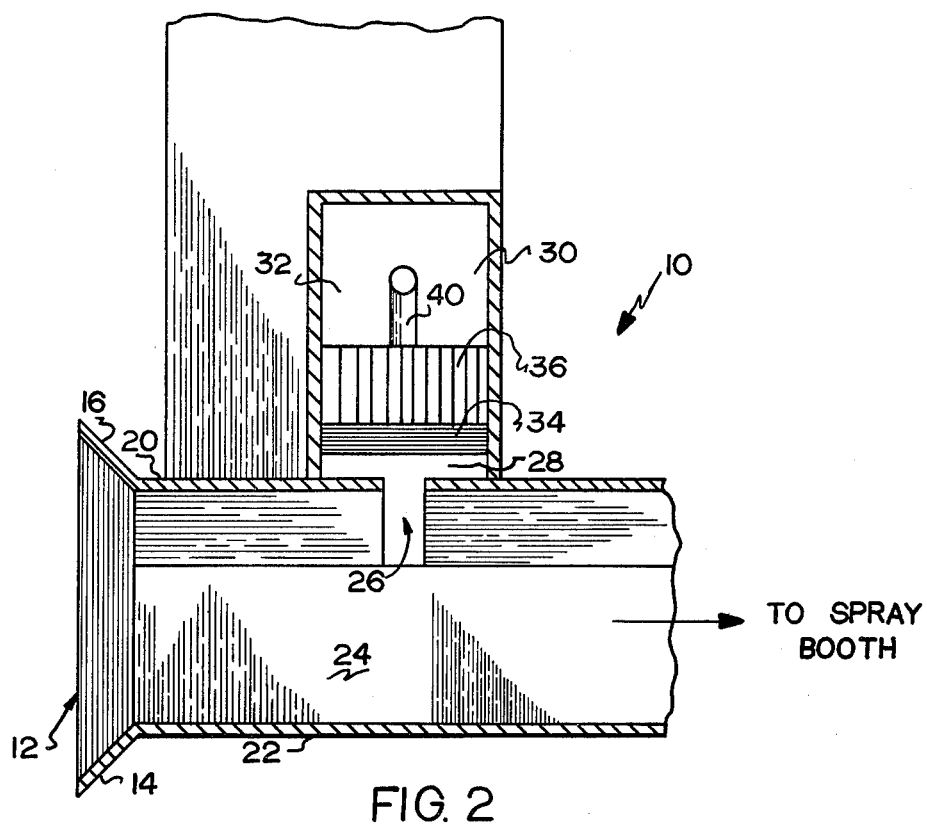
FIG. 2 is a sectional view of the structure of FIG. 1 taken along the line 2—2.
Figure 3:
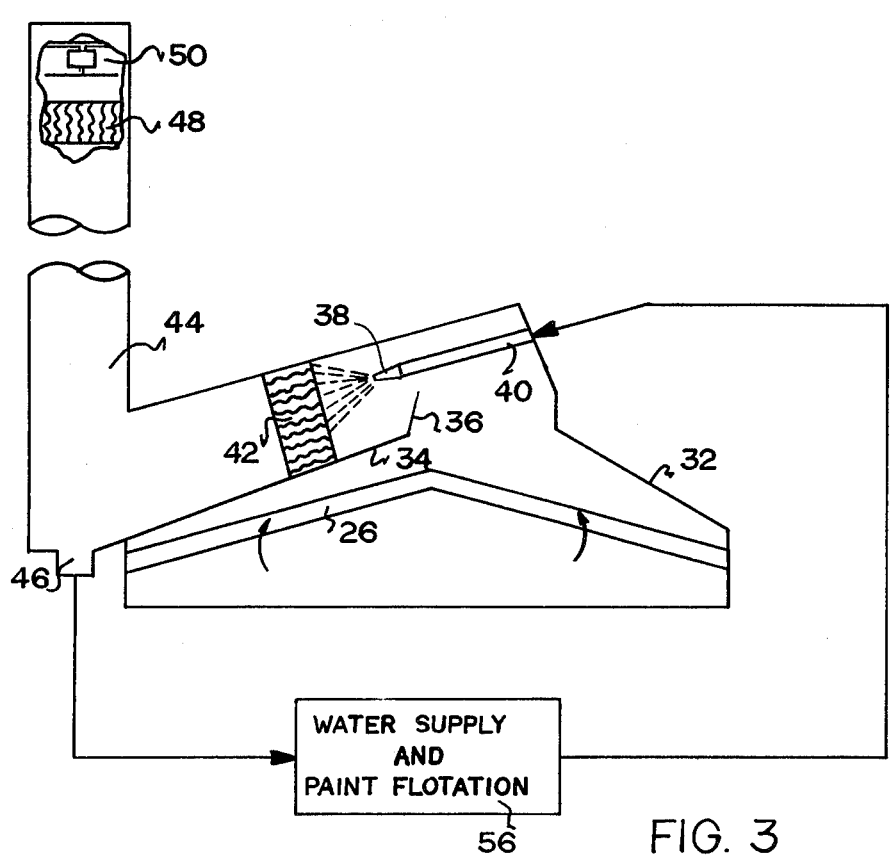
FIG. 3 is a diagrammatical view of the structures of FIGS. 1 and 2 showing the functional operation of the same.

Referring now to the drawings and more particularly FIGS. 1–3, a first embodiment of the vapor precipitation and recovery system of the invention may be seen as designated generally by the numeral 10. The system includes a passage 12 which communicates with a spray coater booth (not shown) for passing products to the booth for spray coating, or for receiving the products from the booth after the same have been coated. Accordingly, it will be understood that there would typically be provided two systems 10, one at the entrance to the coating booth, and the other at the exit of the booth. Obviously, a conveyor system of a suitable nature passes through the passage 12 for carrying products to the booth.

The passage 12 is characterized by a lower lip 14, flared or extending downward along the bottom edge thereof, and upper lip 16 extending along the top edge thereof. In the particular embodiment shown, the lips 16 are angled with respect to the horizontal and intersect at an apex centrally above the passage 12. Side lips 18 flare or extend outwardly from the passage 12, interconnecting the lower lip 14 with the upper lip 16 as illustrated. The flaring of the lips, best illustrated in FIG. 2, effectively enlarges the opening of the passage 12 and provides a funnel effect for drawing air from the ambient into the passage. By effectively enlarging this opening, the ambient air is more efficiently drawn into the passage 12 and to the system 10 to prevent escape of the vapor cloud within the coater booth. Top and bottom plates 20,22 (FIG. 2) are interconnected by side plates to define a tunnel extending from the flared lips 14,16 and 18 to the slot opening 26. The tunnel portion between the slot opening 26 and the front opening defined by the lips 14,16 and 18 establishes a vestibule 24. The opening 26 transverses substantially across the entire width of the top plates 20, thereby providing an opening across the top of the tunnel.

The opening 26 in the top plates 20 substantially transverses the tunnel, making communication with an input chamber 28, maintained within the housing 32, which similarly transverses the tunnel. Communicating with the input chamber 28 is a scrubbing chamber 30, also maintained within the housing 32. The scrubbing chamber 30 is defined by a base plate 34 which extends between the side walls of the housing 32 and is angled downwardly as best shown in FIG. 1. Similarly interconnected between the walls of the housing 32 and extending upwardly from a back edge portion of the base plate 34 is a shield plate 36. This shield plate isolatess the spray nozzle 38, maintained within the scrubbing chamber 30, from back splashing or misting into the input chamber 28, and subsequently through the opening 26 onto the product being conveyed to or from the coating booth. The spray nozzle 38 is preferably of the full cone type for purposes of creating a draft through the opening 26, input chamber 28, and into the scrubbing chamber 30, flooding the baffle 42.

It will be appreciated that with the base plate 34 and shield plate 36 interconnectingly extending between the side walls of the housing 32, communication with the scrubbing chamber 30 is achieved only through the opening 26 and input chamber 28.

Water or other suitable precipitant is provided through the conduit 40 to the full cone spray nozzle 38. This spray of precipitant is directed onto the precipitant baffle 42 of the type previously used in this art at the top of the exhaust stack. However, in the instant invention, the baffle 42 is not placed within the exhaust stack of the recovery system, but is placed in immediate juxtaposition to the spray nozzle 38, covering the cross-section of the chamber 30. Accordingly, ambient air and vapor drawn through the opening 20 and into the scrubbing chamber 30 is forcefully sprayed against the baffle 42 by means of a precipitant emitted from the nozzle 38. Typically, the included spray angle of the nozzle 38 would be 95°–125°, dependent upon spray force, with 110° being preferred. Further, the nozzle 38 would normally be positioned within a foot of the baffle 42, and preferably within six inches thereof, dependent upon the size of the face surface of the baffle and the included angle of the nozzle. It is desired to have the nozzle as close to the baffle as possible while obtaining full coverage of the baffle.

The tortuous path through the baffle 42 causes paint and contaminants suspended in the vapor to be precipitated into large droplets on the exit side of the baffle 42, such large droplets or particles washing directly into a recovery tank, obviating the necessity of a plenum chamber. Accordingly, the exit side of the baffle 42 goes directly to an exhaust stack 44, having a drain 46 at the bottom thereof for conveying precipitated liquids to an appropriate recovery tank. The scrubbed vapors and air then exhaust upwardly through the exhaust stack 44.

In the embodiment of FIGS. 1–3, it is contemplated that there may be a baffle 48 provided at the top of the exhaust stack 44 to condense any precipitated paint or contaminants seeking to escape through the stack. However, with the spray nozzle 38 directed against the baffle 42, the baffle 48 will generally not be required. As further illustrated in FIG. 3, the exhaust fan 50 is provided at the top of the stack 44 for assisting in the creation of a draft from the coating booth and ambient, through the opening 26 and input chamber 28, for ultimate cleaning of the scrubbing chamber 30.

As illustrated in FIG. 1, a door 52 may be provided for accessing the baffle 48 and fan 50 for any required servicing or repair. A similar door 54 may be provided in a lower part of the stack 44 for access thereto. It is also presented that a door (not shown) would generaly be included on the top panel of the housing 32 to allow access to the input chamber 28, scrubbing chamber 30, nozzle 38 and baffle 42. It will be understood that the input chamber 28 will require occasional cleaning, since that chamber is subjected to a combination of solvent-rich vapors and ambient air. Since the ambient air reduces the solvent-rich atmosphere of the vapors, paint particles and other suspended contaminants have a tendency to adhere to the walls of the input chamber 28.

It should also be noted with respect to the system of FIGS. 1–3 that various parameters must be considered to assure that the expanding vapor cloud does not escape out of the passage 12, but is totally drawn through the opening 26 to the scrubbing chamber. To obtain proper draft, the fan 50 and cone nozzle 38 must be appropriately selected as must the length of the vestibule area 24 and the size of the flared opening defined by the lips 14,16 and 18. While the prior art has taught a gentle draft for drawing the vapor cloud, by directly spraying the baffle 42 larger velocities of air drawn can be accommodated, since the larger particle sizes affected by the nozzle 38 and baffle 42 settle at higher velocities than smaller particles. Accordingly, with larger air drafts generated, escape of the vapor cloud is diminished over systems of the prior art.

Of course, the recovery system 10 would typically include a water supply and paint flotation tank 56 in communication with the drain 46. The liquid passing through the baffle 42 is transferred by the drain 46 to the tank 56 where paint and other contaminants are floated to the top, filtered, and recycled for use in the spray booth. Water which is lost as by mist or evaporation is replenished from an appropriate water supply, and the water is recirculated through the conduit 40 to the spray nozzle 38. In this fashion, economic use of paint or other coating sprays is achieved, as well as an economic use of the water or other precipitant.

In the operation of the embodiment of FIGS. 1–3, a part to be coated is transported through the passage 12 and into a spray booth for coating. The expanding vapor cloud in the spray booth is drawn by the fan 50 and cone nozzle 38 upward through the opening 26 and input chamber 28 and into the scrubbing chamber 30. Ambient air is similarly drawn through the flared opening of the passage 12, the vestibule 24, and through the opening 26. This air flow prevents escape of the vapor cloud from the passage 12. The precipitant from the nozzle 38 drives the vapor-air mixture against the baffle 42 where paint and other contaminants contained in the vapor are precipitated into large droplets which fall through the drain 46 into the paint flotation tank 56. The scrubbed air and vapor is then exhausted up the stack 44. When coating of the part has been accomplished, the part is transported out though a corresponding passage 12 having a similar recovery system in association therewith, it being understood that there would typically be a recovery system of the nature shown in each end of the coating booth.

Figure 4:
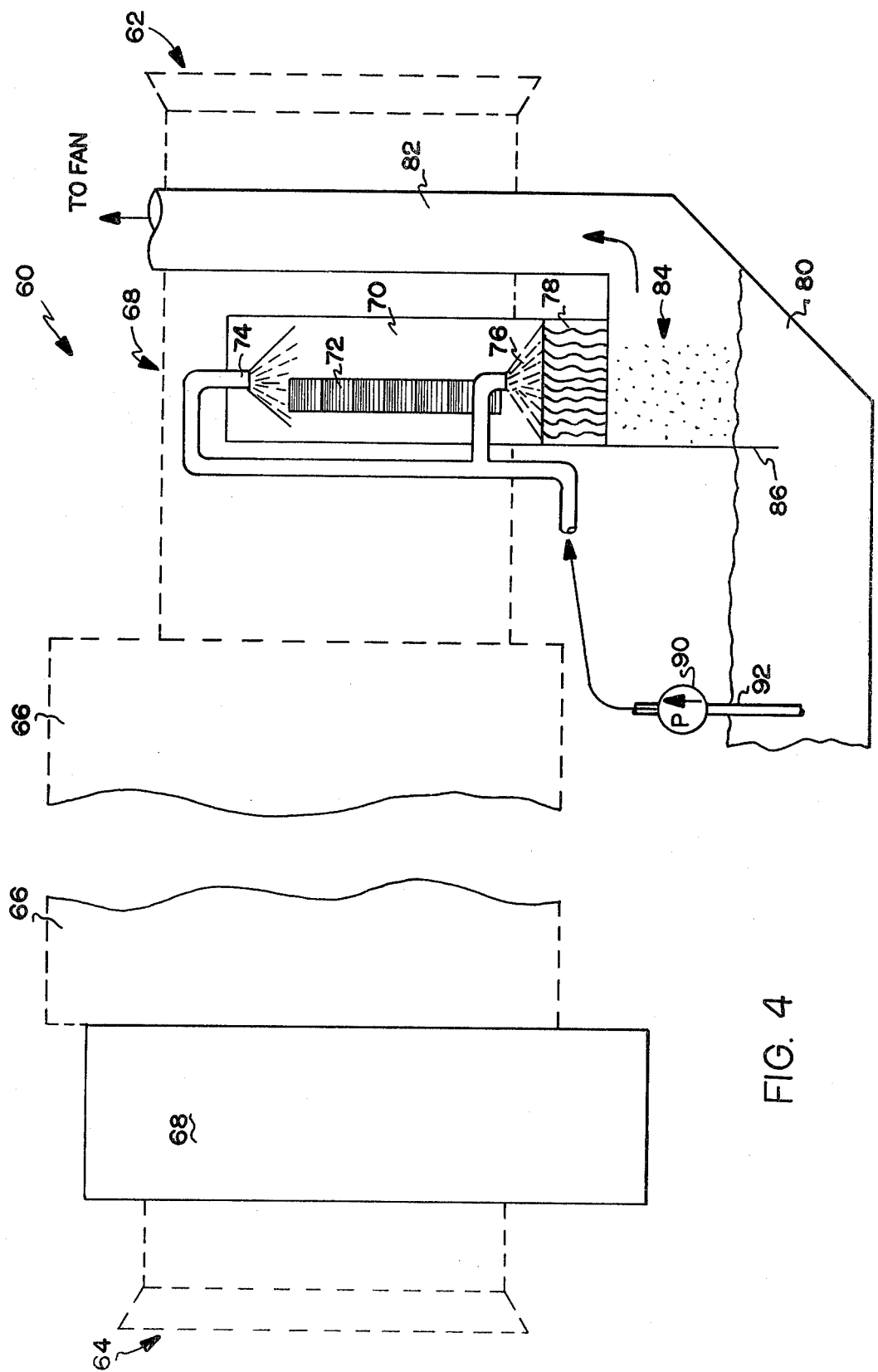
FIG. 4 is a diagrammatical illustration of a second embodiment of the invention.

Another embodiment of the concept of the invention is diagrammatically illustrated in FIG. 4 and designated by the numeral 60. As illustrated, the entrance 62 and exit 64 of the coating booth 66 are characterized by a flared opening to facilitate ambient air flow into the recovery system. As illustrated, there is a vapor recovery system 68 positioned at each end of the spray booth 66 and in communicaton therewith.

The recovery system 68 comprises a single chamber 70 which communicates with the entrance 62 by means of a baffle or vaned vent 72. The vanes of the baffle 72, as illustrated in FIG. 4, are inclined upwardly and inwardly into the passage such that precipitant spray from the cone nozzle 74 will not enter the passage from the entrance 62 to the coating booth 66. As in the embodiments of FIGS. 1–3, the area between the vaned vent 72 and the entrance 62 defines a vestibule for purposes discussed hereinabove.

The nozzle 74 is preferably a low velocity hollow cone nozzle, particularly as related to a higher velocity full cone nozzle 76 which sprays directly onto the precipitant baffle 78 which covers the cross-section of the chamber 70, as shown. The nozzle 74 is positioned above the vent 72 a sufficient distance that the precipitant spray therefrom washes all wall surfaces of the chamber 70 below the top of the vent 72. Such positioning thus depends on the dimensional cross-section of the chamber 70 and the included angle of the nozzle 74. Preferably, the nozzle 74 has an included angle of 110° and is positioned within six inches of the top of the vent 72. In any event, it is desired that the included angle be between 95°–125° and that the nozzle 74 be within one foot of the top of the vent 72. Similarly, the full cone nozzle 76 would typically have an included angle of 95°–125°, dependent on spray force, with 110° being preferred. The nozzle 76 would normally be positioned within a foot of the baffle 78, and preferably within six inches thereof, dependent upon the size of the face surface of the baffle and the included angle of the nozzle. It is preferred to have the nozzle as close to the baffle as possible while obtaining full spray coverage of the baffle.

The large droplets or particles of contaminants precipitated by the baffle 78 drop directly into the recovery tank 80, there again being an absence of a settling or plenum chamber. The scrubbed vapors and air are exhausted via the exhaust 82 again having an exhaust fan at the top thereof. Of course, if the situation requires, a baffle may be provided in the exhaust 82, although the same is not deemed required. As illustrated, the large particles precipitated by the spray 76 against the baffle 78 are received by the tank 80, while the scrubbed air and vapor are directed totally to the exhaust 82 by the dividing plate 86 which isolates the remainder of the recovery tank from such gaseous elements. With the plate 86 depending into the fluid as illustrated, this isolation or blocking is achieved.

As with the embodiment of FIGS. 1–3, the precipitant in the tank 80 is recycled to the spray nozzles 74,76, while the paint, coatings, or contaminants which float to the top of the tank are filtered and recycled to the spray booth 56. A pump 90 communicates with the tank 80 through the conduit 92, drawing precipitant from the tank 80 to the nozzles 74,76. In effect, the system 60 operates in a closed loop mode, recirculating the precipitant between the tank 80 and the nozzles 74,76. It has been found that with continuous operation, precipitant need be replenished only about three times weekly.

It will, of course, be appreciated that the recovery system 68 adjacent the exit 64 is substantially of identical structure to that just described.

In operation, as parts pass between the entrance 62 and exit 64, being coated in the booth 66, the solvent-rich vapor within the booth 66 and the ambient are are drawn through the baffled vent 72 into the single chamber 70. The top hollow cone 74 continually cleans the chamber 70 by spraying from the top thereof downward, while the lower full cone nozzle 76 drives the combination of air and vapor through the precipitant baffle 78 to create large particles 84 for settling into the tank 80. The scrubbed vapors then exhaust up the stack 82 via an appropriate fan at the top thereof. Of course, the nozzles 74,76 aid in generating the required draft, as does the flaring of the opening and the length of the vestibule. In this embodiment, the single chamber is constantly washed, and servicing needs are greatly reduced. Only the baffled vent 72 is susceptible to paint or other coating adhered thereto. To limit down time, it is contemplated that the vent 72 may be removably secured between the chamber 70 and the passageway and that it be of the type which may be easily cleaned. Of course, when the vent 72 is removed for cleaning, a new or previously cleaned vent may be immediately replaced to limit the down time. As a point of fact, the vent 72 may be of plastic or other suitable material to which the coating will not tightly bond. Further, and similar to the earlier discussed embodiment, with the baffle 78 being directly sprayed by the nozzle 76, there is virtually no likelihood that it will plug or clog, greatly reducing the need for servicing of the same.

It should now be apparent that the embodiment of FIG. 1, being vented at the top of the entrance and exit passages is particularly adapted for continuous coaters spraying horizontally received products. Similarly, the embodiment of FIG. 4, vented at the sides of the entrance and exit passages, is particularly adapted for continuous coaters spraying vertically received products.

Thus it can be seen that the objects of the invention have been satisfied by the structure and techniques presented hereinabove. The invention substantially reduces the size of the recovery systems over those previously known while greatly reducing the maintenance required for the same. Additionally, the complexity of the structure and the inherent costs have been significantly reduced.

While in accordance with the patent statutes only the best known and preferred embodiments of the invention have been presented and described in detail, it is to be understood that the invention is not limited thereto or thereby. Accordingly, for an appreciation of the true scope and breadth of the invention, reference should be had to the appended claims.

What is claimed is:

1. In a continuous coater having entrance and exit passages and a spray booth, at least one of the passages communicating with said spray booth, the improvement of a vapor precipitation and recovery system, comprising:

a scrubbing chamber located above said at least one passage;

a slot opening, said opening located substantially across the entire width of the top of said at least one passage so that said at least one passage communicates with said scrubbing chamber;

said scrubbing chamber having a spray nozzle means for providing a spray;

a precipitant baffle maintained within said scrubbing chamber and in close juxtapositional relationship to said spray nozzle means so as to be sprayed thereby;

said scrubbing chamber having a shield plate located between said spray nozzle means and said slot opening;

an exhaust stack, said exhaust stack located adjacent to said scrubbing chamber and being in communication therewith.

2. A continuous coater according to claim 1 wherein said spray nozzle means is within one foot of said precipitant baffle.

3. A continuous coater according to claim 2 wherein said spray nozzle means comprises a nozzle having an included spray angle of 95°–125°.

4. A continuous coater according to claim 3 wherein said nozzle is a full cone nozzle.

5. A continuous coater according to claim 1, wherein said precipitant baffle is positioned immediately below said exhaust stack.

6. A continuous coater according to claim 5, including a recovery tank, and wherein said precipitant baffle is positioned immediately above said recovery tank.

7. A continuous coater according to claim 1 wherein said scrubbing chamber communicates with said at least one passage through an input chamber, said input chamber communicating with said slot opening.

8. A continuous coater as recited in claim 7 wherein said opening traverses said at least one passage across the entire width thereof.

9. A continuous coater as recited in claim 1 wherein said opening is unidirectionally obstructed by a vaned vent.

10. A continuous coater as recited in claim 9 wherein said vaned vent is removably received within said opening.

11. A continuous coater as recited in claim 10 wherein said spray nozzle means comprises a pair of spray nozzle means positioned at opposite ends of said vaned vent.

12. A continuous coater as recited in claim 11, including a recovery tank wherein said precipitant baffle is positioned directly above said recovery tank, and at the bottom of said exhaust stack.

13. A continuous coater, comprising:
a spray booth maintaining a solvent-rich atmosphere of vapors therein;
entrance and exit passages communicating with said spray booth;
a scrubbing chamber adjacent at least one of said passages and in vapor-receiving communication therewith;
said scrubbing chamber located above said at least one passage;
a slot opening, said slot opening located substantially across the entire width of the top of said at least one passage so that said at least one passage communicates with said scrubbing chamber;
a precipitant baffle maintained within said scrubbing chamber;
a first precipitant spray nozzle maintained within a foot of said baffle and arranged to provide a spray which covers said baffle; and
an exhaust stack, said exhaust stack located adjacent to said scrubber chamber and in communication therewith.

14. The continuous coater according to claim 13 wherein said first nozzle is a full cone nozzle.

15. The continuous coater according to claim 14 wherein said first nozzle has an included spray angle of 95°–125°.

16. The continuous coater according to claim 14 wherein said scrubbing chamber communicates with said at least one passage through a vertically extending vaned vent.

17. The continuous coater according to claim 16 which further includes a second precipitant spray nozzle maintained within said scrubbing chamber above said vaned vent.

18. The continuous coater according to claim 17 in which said second nozzle is a hollow cone nozzle.

* * * * *